United States Patent [19]
Hodges

[11] Patent Number: 5,500,968
[45] Date of Patent: Mar. 26, 1996

[54] DOCK LEVELER INCORPORATING AN INFLATABLE BAG

[75] Inventor: Charles H. Hodges, Ruxton, Md.

[73] Assignee: Kelley Company, Inc., Milwaukee, Wis.

[21] Appl. No.: 250,650

[22] Filed: May 27, 1994

Related U.S. Application Data

[63] Continuation of Ser. No. 814,002, Dec. 26, 1991, abandoned.

[51] Int. Cl.⁶ ....................................................... E01D 1/00
[52] U.S. Cl. ............................ 14/71.7; 254/932; 14/71.3
[58] Field of Search .................................... 14/71.7, 71.3, 14/71.1, 70, 35; 254/93 L, 93 R, 93 HP

[56] References Cited

U.S. PATENT DOCUMENTS

| 2,495,092 | 1/1950 | Cox et al. |
| 2,804,118 | 8/1957 | Bayerkohler . |
| 3,117,332 | 1/1964 | Kelley et al. . |
| 3,211,425 | 10/1965 | Greulich et al. . |
| 3,521,861 | 7/1970 | Freudenthal et al. . |
| 3,528,118 | 9/1970 | Smith . |
| 3,659,899 | 5/1972 | Phillips et al. ........................ 298/22 R |
| 3,711,157 | 1/1973 | Smock ..................................... 298/8 R |
| 4,012,804 | 3/1977 | Catlett . |
| 4,081,874 | 4/1978 | Artzberger . |
| 4,343,058 | 8/1982 | Loblick ..................................... 14/71.7 |
| 4,572,579 | 2/1986 | Saito ..................................... 254/93 HP |
| 4,688,760 | 8/1987 | Garman et al. ..................... 254/93 HP |
| 4,955,923 | 9/1990 | Hageman ................................. 14/71.7 |

FOREIGN PATENT DOCUMENTS

| 2354388 | 5/1974 | Germany . |
| 161243 | 7/1964 | U.S.S.R. . |
| 835142 | 5/1960 | United Kingdom . |

Primary Examiner—Stephen C. Pellegrino
Assistant Examiner—Nancy Malcare
Attorney, Agent, or Firm—Michael, Best & Friedrich

[57] ABSTRACT

A dock leveler comprising a ramp hinged at its rear end to a supporting structure and movable between a generally horizontal position and an upwardly inclined position. A lip is hinged to the forward edge of the ramp and can be pivoted between a downwardly hanging pendant position and an extended position. Interposed between the ramp and the supporting structure is an inflatable bag, while a second inflatable bag interconnects the ramp and the lip. Blowers mounted beneath the ramp supplies low pressure air to both bags, and inflation of the first bag will move the ramp upwardly to the inclined position, while inflation of the second bag will move the lip from the pendant to the extended position.

22 Claims, 2 Drawing Sheets

DOCK LEVELER INCORPORATING AN INFLATABLE BAG

This is a continuation of application Ser. No. 07/814,002, filed Dec. 26, 1991 now abandoned.

BACKGROUND OF THE INVENTION

A dock leveler is frequently employed to span the gap between a loading dock and a carrier or truck parked in front of the dock to enable material handling equipment, such as a fork lift truck, to pass freely between the dock and the truck bed.

One common form of dock leveler is an upwardly biased mechanical type, which is mounted within a pit or depression formed in the upper surface of the loading dock. The dock leveler includes a supporting frame that is located within the pit, and a ramp or deck plate is hinged at its rear edge to the frame and can be pivoted from a generally horizontal position, where the ramp is flush with the upper surface of the dock, to an upwardly inclined position. Attached to the forward edge of the ramp is a lip which can be pivoted between a downwardly hanging pendant position and an outwardly extended position, where it forms an extension to the ramp.

In an upwardly biased dock leveler, the ramp is biased or urged to the upwardly inclined position by a counterbalancing spring assembly, which is located in the pit beneath the ramp and is connected to the rear edge of the ramp through a lever arm. The force of the counterbalancing spring assembly will urge the ramp to the inclined position.

The typical upwardly biased dock leveler also includes a holddown, which is a one-way locking device that permits downward movement of the ramp, but will prevent upward movement of the ramp unless released. The typical holddown is located beneath the ramp and is connected between the undersurface of the ramp and the supporting frame.

To pivot the lip to the extended position, the conventional dock leveler includes a lip lifting and locking mechanism. With a mechanism of this type, the lip is automatically pivoted to the extended position, as the ramp is moved downwardly from the inclined position, and the lip is locked in the extended position.

The conventional upwardly biased dock leveler also includes cross traffic legs, which are pivoted to the forward edge of the ramp and are adapted to engage supports on the frame to maintain the ramp in the horizontal position. To enable the ramp to move downwardly to a below dock level position, the typical legs can be pivoted to a retracted position through a manually operated cable mechanism.

To begin a loading operation, an operator standing on the loading dock, will release the holddown to enable the ramp to pivot upwardly under influence of the counterbalancing spring. Once the ramp has reached its upwardly inclined position, the holddown is released and the operator walks outwardly on the ramp. The combined weight of the operator, along with the weight of the ramp, will overcome the force of the spring to enable the ramp to be moved downwardly. The holddown permits free downward movement of the ramp.

As the ramp moves downwardly, the lip will be pivoted outwardly to the extended position by the lip lifting and latching mechanism, and latched in the extended position. The ramp is walked down until the extended lip engages the bed of the truck parked in front of the loading dock, at which time the weight of the lip is removed from the latching mechanism which will release the lip latch. After the loading operation has been completed, the truck can pull away from the loading dock and the lip will then pivot downwardly by gravity to its pendant position.

During a loading operation, the truck bed will move up or down in relation to the loading dock as cargo is removed or added to the truck bed, and the holddown mechanism is constructed in a manner to permit upward float of the dock leveler to accommodate upward movement of the truck bed.

The typical upwardly biased dock leveler is a complex structure, having a multiplicity of moving parts, and as a consequence, relatively high maintenance costs can be incurred.

Due to the inclusion of the counterbalancing spring assembly, the holddown, the lip lifting and latching mechanism and the cross traffic legs, the typical dock leveler has a considerable shipping weight which adds to the overall cost of the dock leveler.

Dock levelers vary in size and weight, and thus different size counterbalancing springs are required for different sized dock levelers, and this necessitates a substantial inventory of the counterbalancing springs.

As a further problem, the conventional upwardly biased dock leveler includes a relatively large sub-frame which is mounted in the pit, and as a result the pit area is difficult to clean, for debris cannot be merely swept out of the pit.

It has also been found that if the operator is relatively lightweight, the weight of the operator may not be sufficient to overcome the force of the counterbalancing spring to enable the ramp to be walked down into engagement with the truck bed.

A second common form of dock leveler, is hydraulically operated, and includes a main hydraulic cylinder, that is interconnected between the subframe and the ramp and acts to pivot the ramp to the upwardly inclined position, and a lip cylinder which interconnects the ramp and the lip and serves to pivot the lip to the extended position.

A hydraulic dock leveler includes a complicated and expensive hydraulic system, in which the supply of fluid is sequenced to initially supply fluid to the main cylinder and then to the lip cylinder.

Due to the concentrated application of force through the hydraulic cylinders, the portions of the ramp and lip to which the cylinders are attached must be reinforced and this not only adds to the cost of the dock leveler, but also adds considerably to the shipping weight.

SUMMARY OF THE INVENTION

The invention is directed to a dock leveler, in which the ramp and lip are operated by means of inflatable members or bags.

In accordance with the invention, a first inflatable bag is located between the bottom of the pit in the loading dock and the undersurface of the ramp, while a second bag interconnects the ramp and the lip.

The ramp actuating bag is supported on a rigid base plate which rests on the bottom of the pit, while the upper surface of the bag is connected to an upper plate which bears against the underside of the ramp or deck plate. The bag can be provided with circumferential pleats or flutes and is constructed in a manner such that inflation of the bag will cause the bag to move in a generally curved or arcuate path to pivot the ramp from the horizontal to the upwardly inclined position.

The lip actuating bag is located beneath the ramp and preferably extends the width of the ramp. The bag is located between a fixed plate which is attached to the ramp and a movable plate which is connected through a linkage to the lip. Inflation of the lip bag will move the linkage forwardly to pivot the lip from the pendant to the extended position.

The ramp and lip bags can each be inflated by a fan or blower mounted to the underside of the ramp and the blowers supply a low pressure gas, such as air, to the bags. The pressure developed in the bags is generally in the range of about 0.5 to 5.0 psig and, due to the substantial surface area of the bags, this pressure will be sufficient to overcome the weight of the ramp and the lip to pivot the ramp and lip to their extended positions.

The use of the inflatable bags provides a simple and inexpensive mechanism for pivoting the ramp and the lip of a dock leveler. The number of moving parts is substantially reduced over that of conventional mechanical or hydraulic-type dock levelers.

The dock leveler of the invention eliminates the need for the standard sub-frame as used with mechanical or hydraulic dock levelers and this not only reduces the overall cost of the dock leveler, but also provides a substantial reduction in shipping weight.

The dock leveler of the invention requires only a shallow pit having a depth of approximately fifteen inches, as compared with a pit depth in the range of nineteen to twenty-three inches, as required by a typical mechanical or hydraulic dock leveler.

The dock leveler eliminates the counterbalancing spring assembly, the holddown, the lip lifting and latching mechanism, and the cross traffic legs, as used with a conventional upwardly biased mechanical dock leveler, thus providing a substantial cost reduction. Moreover, once the lip is engaged with the truck bed, the dock leveler can follow upward and downward float of the truck bed during the loading operation, due to the compressive nature of the air in the bags and without the need of any auxiliary equipment.

As a further advantage, a single ramp bag and a single lip bag could be used with a complete line of various sized dock levelers.

As the lip is actuated by air pressure in the inflatable bag, the lip is yieldable. Therefore, if a truck should accidentally back into the extended lip, the lip will yield to prevent damage to the lip.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
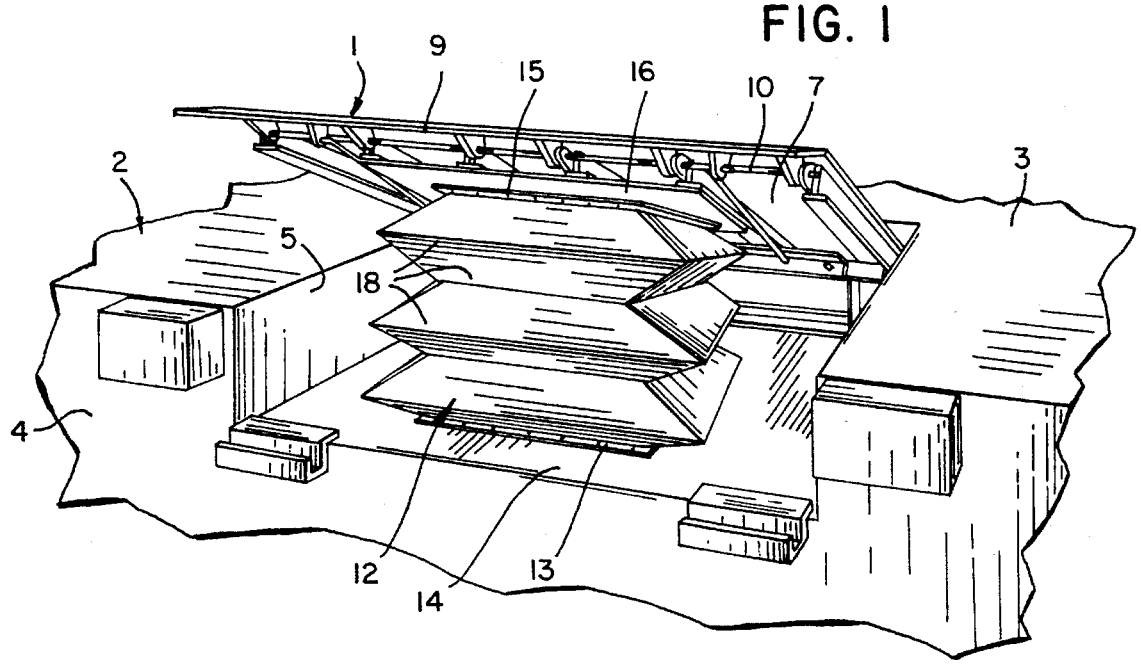
FIG. 1 is a perspective view of the dock leveler of the invention with the ramp in the elevated position.
Figure 2:
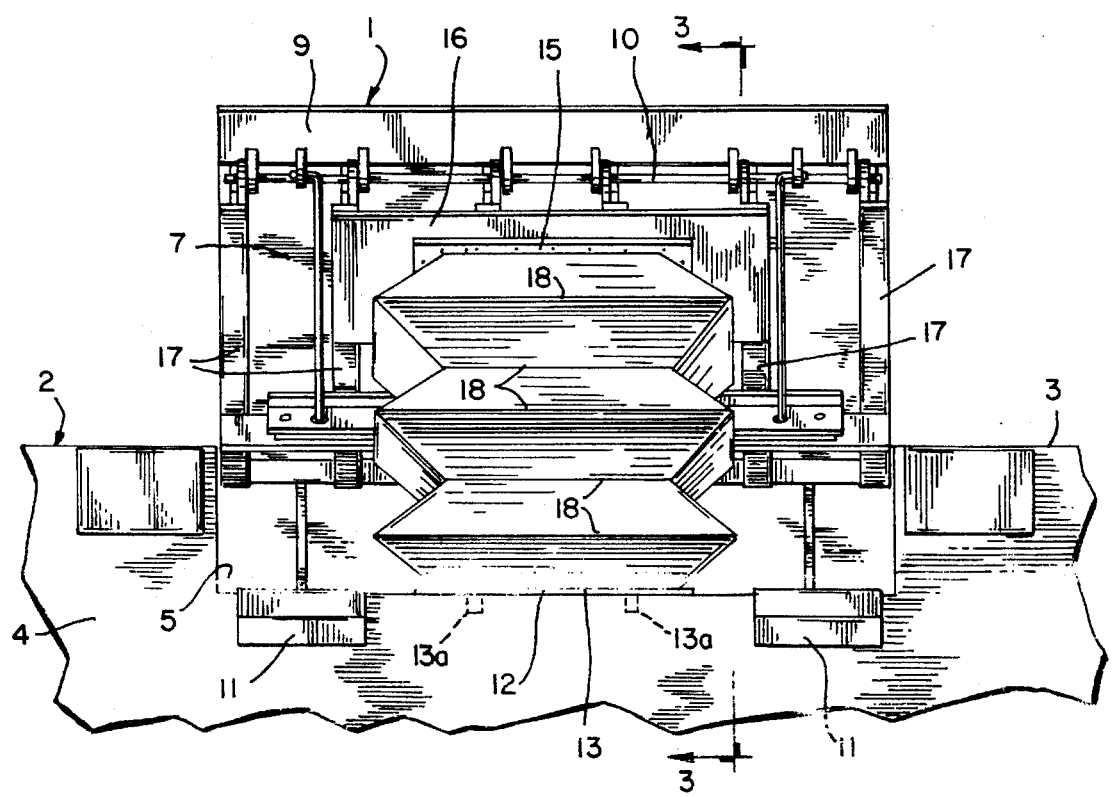
FIG. 2 is a front elevation of the dock leveler shown in FIG. 1.

The drawings illustrate a dock leveler 1, which is mounted on a loading dock 2. Dock 2 includes an upper generally horizontal surface 3 and a vertical face 4. Dock leveler 1 is mounted in a pit or depression 5 in dock 2.

Figure 3:
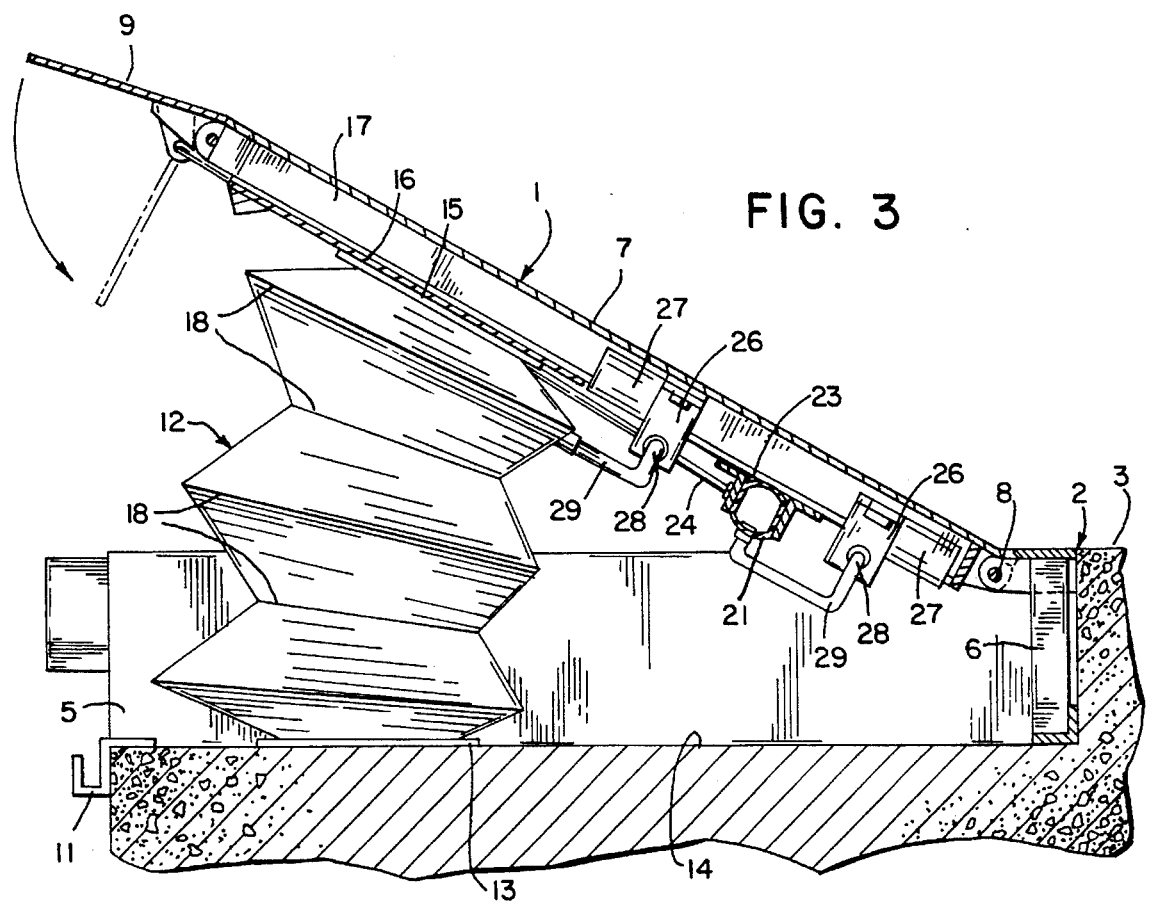
FIG. 3 is a side elevation of the dock leveler with the ramp in the elevated position and the lip extended.

Dock leveler 1 includes a supporting structure or frame 6, which is located at the rear of pit 5, and the rear edge of a ramp or deck plate 7 is pivoted to the supporting structure 6 through hinge pins 8, which interconnect lugs on the rear edge of the ramp with lugs on the frame 6. With this connection, the ramp can be pivoted between a generally horizontal position, as shown in FIG. 4, and an upwardly inclined position, as shown in FIG. 3.

Pivoted to the forward edge of ramp 7 is a lip 9. Hinge pins 10 interconnect lugs on the ramp and lip 9 to provide the hinge connection. Lip 9 is adapted to be pivoted between a downwardly hanging pendant position, as shown in FIG. 4, and an extended position, as shown in FIG. 3, where the lip forms an extension to the ramp. In the extended position, the rear edge of the lip will engage the forward edge of the ramp to limit the extended position of the lip.

Figure 4:
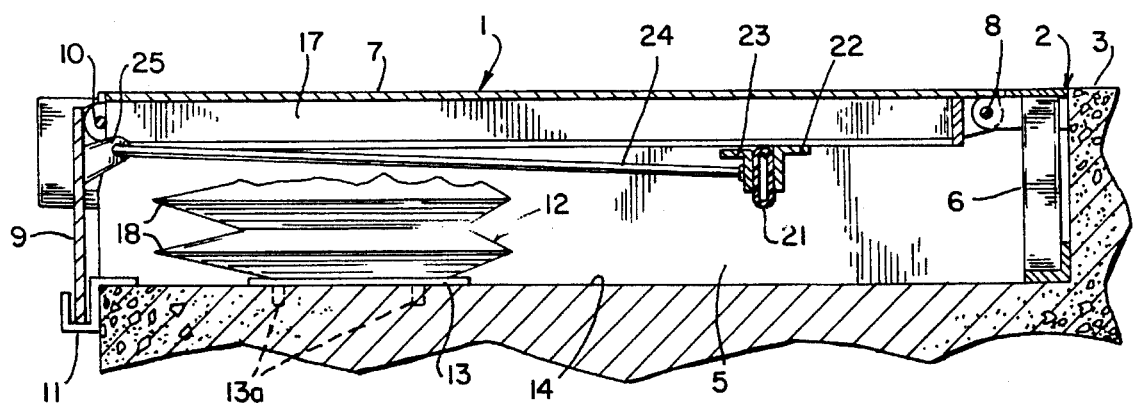
FIG. 4 is a view similar to FIG. 3 showing the ramp in the horizontal position with the lip pendant.

To hold the ramp 7 in a horizontal position, as shown in FIG. 4, a pair of keepers 11 are mounted on the front face 4 of the dock 2, and the lower edge of the pendant lip 9 is received within the keepers 11 to maintain the ramp in a horizontal position.

In accordance with the invention, ramp 7 is pivoted between the horizontal position and the upwardly inclined position by a flexible, inflatable member or bag 12. The lower end of bag 12 is secured to a rigid plate 13 which rests on the bottom 14 of pit 5. The upper end of bag 12 is secured to an upper plate 15, which is mounted to a plate 16 that is secured to the lower surfaces of the parallel beams 17 of ramp 7.

Bag 12 is preferably formed with a plurality of circumferential pleats or folds 18, which aid in controlling the deflation of the bag.

To prevent bag 12 from shifting horizontally on the bottom 14 of pit 5, locators in the form of pins 13a extend downwardly from plate 13 and are received in holes in pit bottom 14. The locators 13a, while preventing horizontal shifting of bag 12 will nevertheless permit the bag to be manually elevated from the pit floor 14.

In addition to the ramp bag 12, a second flexible lip bag 21 is utilized to move the lip from the pendant to the extended position. Lip bag 21 is generally circular in cross section when in the inflated condition, as shown in FIG. 3, and extends substantially the full width of ramp 7. Bag 21 is secured between a fixed angle or pressure member 22 which is mounted to the underside of beams 17 of ramp 7, and a parallel movable angle or pressure member 23. A pair of rods 24 extend forwardly from angle 23 and are connected to lugs 25 that are attached to the underside of the lip. With bag 21 deflated, as shown in FIGS. 4, the lip will be in the pendant position. Inflation of bag 21, as shown in FIG. 3 will move rods 24 forwardly to pivot the lip 9 from the pendant to the extended position.

Bags 12 and 21 are preferably constructed of woven fabric impregnated with a plastic material or resin, making the bags impervious.

As illustrated, bags 12 and 21 can each be inflated by a separate low pressure blower or fan 26 and 30, respectively, and each fan is preferably mounted to the underside of the ramp and is operated by an electric motor 27 and 31. The outlet 28 of each fan is connected through a conduit 29 to the respective bag.

Fans 26 and 30 are each adapted to supply air at a relatively low pressure in the range of 0.5 to 5.0 psig. As the bags 12 and 21 have a large surface area that is in contact with the movable element, the low pressure air will be sufficient to elevate the ramp 7, as well as extending the lip 9. In practice, the top and bottom surfaces of ramp bag 12 each have an area of about 5 to 25 square feet, and the opposed surfaces of lip bag 21, i.e. those surfaces engaged with angles 22 and 23, each have an area of 100 to 500 square inches.

In operation, with a truck in a loading position in front of dock 2, the operator will actuate an "ON" button on the loading dock which will operate the ramp blower motor 27 to supply air to the ramp bag 12, causing the bag to inflate and pivot the ramp 7 upwardly to the upwardly inclined position. After the ramp 7 is partially or fully elevated, the operator can actuate a second "ON" button on the dock to operate the lip blower motor 31 thereby supplying air to the lip bag 21 to move the lip 9 from the pendant to the extended position. Alternately, a single operating button can be utilized to supply air to both the ramp and lip bags, with suitable controls to delay the supply of air to the lip bag 21 until after the ramp bag 12 is partially or fully inflated.

When the ramp 7 is fully elevated, operation of the blower is discontinued, and the ramp will slowly descend by gravity. The weight of the ramp and lip will act to deflate the bags with the air escaping back through the blowers 26 and 30. The control system can be designed, so that the deflation of the lip bag 21 is delayed relative to deflation of bag 12, so that the lip will remain in the extended position as the ramp is lowered.

Continued downward movement of the ramp 7 will bring the extended lip 9 into contact with the truck bed, so that the dock leveler will then span the gap between the loading dock and the truck bed to enable material handling equipment to pass freely between the dock and the truck bed. After the loading operation is completed, the truck will pull away from the loading dock and the lip will fall by gravity to the pendant position, as shown in FIG. 4.

Occasionally, a truck may have end loads, which are loads or cargo located immediately adjacent the rear end of the truck in a position where they interfere with the extension of the lip onto the truck bed. To accommodate end loads, the operator will push the ramp "ON" button for a second or two to partially inflate the ramp bag 12 and elevate the ramp a few inches and then actuate the lip bag "ON" button to supply air to the lip bag 21 and pivot the lip outboard of the keepers 11. The operation of the ramp blower 26 is then discontinued, and the ramp 7 will fall, with the partially extended lip 9 clearing the keepers 11, to an inclined below-dock-level position where the ramp bottoms out against the bottom of the pit 5. With the ramp in this position, the end loads can be removed through use of a fork lift truck, or the like.

The bag 12 has a surface area in contact with the undersurface of the ramp in the neighborhood of about 5 to 25 square feet. With this large surface area, a pressure only in the range of 0.5 to 5.0 psig is required to move the ramp between the horizontal and the upwardly inclined position.

Dock levelers are marketed in various sizes and the size and weight of the ramp and lip can vary from dock leveler to dock leveler. However, with the invention, a ramp bag 12 and lip bag 21 of the same size can be employed with a wide variety of different dock leveler sizes. This is a substantial advantage over other mechanical and hydraulic-type dock levelers, in which different sized power sources are required for different sized dock levelers.

The dock leveler of the invention is of simple construction requiring only minimal moving parts, i.e. the ramp, the lip and the blowers. The need for a counterbalancing spring assembly, a holddown, and a lip lifting and latching mechanism, as required with the typical mechanical dock leveler is eliminated.

The dock leveler also eliminates the need of the normal sub-frame which is employed with the conventional mechanical or hydraulic dock leveler. Eliminating the sub-frame not only reduces the overall cost of the dock leveler, but provides a lighter weight, more compact shipping package. As the forward portion of the pit 5 is free of a supporting frame, there are no forward obstructions so that debris can be readily swept or cleared from the pit. Further, with the ramp locked in the upper elevated position, the bottom plate 13 can be moved upwardly out of engagement with the bottom 14 of pit 5, and the entire pit bottom will then be clear for cleaning.

During a loading operation with the lip supported on the truck bed, the ramp blower 26 will not be operative and the ramp bag 12 will be at ambient pressure. Thus, the dock leveler will follow both upward and downward float of the truck bed. For example, if a load is added to the truck bed, the truck bed will float down against the truck springs and the bag 12 will compress to follow the downward float. Conversely, if a load is removed from the truck bed, the truck bed will move up, and the bag 12 will expand to enable the ramp to follow the upward float of the truck bed.

Various modes of carrying out the invention are contemplated as being within the scope of the following claims particularly pointing out and distinctly claiming the subject matter Which is regarded as the invention.

I claim:

1. A dock leveler to be mounted on a loading dock, comprising a supporting structure, a ramp having a rear edge hinged to the supporting structure and movable between a horizontal position and an upwardly inclined position, a lip hinged to the forward edge of said ramp and movable between a downwardly hanging pendant position and an extended position where the lip forms an extension to the ramp, an inflatable bag interconnected between the ramp and the lip, inflating means connected to said bag for inflating said bag and pivoting said lip from the pendant position to the extended position, a first pressure member connected to said ramp, and a second pressure member connected to said lip, said bag being interposed between said pressure members.

2. The dock leveler of claim 1, wherein said first pressure member is connected to the undersurface of the ramp.

3. The dock leveler of claim 1, wherein the area of said bag in contact with said second pressure member is in the range of 100 to 500 inches.

4. The dock leveler of claim 1, wherein said bag extends substantially the full length of the lip.

5. The dock leveler of claim 1, and including a connecting member connecting said second pressure member to said lip.

6. The dock leveler of claim 1, wherein said inflating means comprises a blower capable of developing a pressure in said bag in the range of 0.5 to 5.0 psig.

7. A dock leveler, comprising a supporting structure, a ramp having a rear edge hinged to the supporting structure and movable between a horizontal position and an upwardly inclined position, a lip hinged to a forward edge of said ramp and movable between a downwardly hanging pendant position and an extended position where the lip forms an extension to the ramp, a first flexible bag disposed between the supporting structure and the ramp, a second flexible bag interconnecting the ramp and the lip, a first blower connected to said first bag for inflating said first bag to pivot the ramp from the horizontal position to the inclined position, and a second blower connected to said second bag for inflating said second bag, inflation of said second bag acting to pivot the lip from the pendant position to the extended position.

8. The dock leveler of claim 7, wherein said first bag has a surface in contact with an undersurface of the ramp, with said surface having an area in the range of 5 to 25 square feet.

9. The dock leveler of claim 7, wherein said supporting structure comprises a loading dock having a generally horizontal upper surface and a vertical face and a pit disposed in said upper surface, said dock leveler being mounted in said pit and said ramp being generally flush with said upper surface when the ramp is in the horizontal position.

10. The dock leveler of claim 9, and including keeper means mounted on the face of the dock and disposed to engage the lip when the ramp is in said horizontal position and said lip is pendant.

11. The dock leveler of claim 10, wherein said keeper means comprises a bracket mounted on said face and having an upwardly facing recess to receive the lower edge of said lip.

12. A dock leveler to be mounted on a loading dock, comprising a supporting structure, a ramp having a rear end hinged to the supporting structure and movable between a generally horizontal position and an upwardly inclined position, a first inflatable member interposed between the supporting structure and the ramp, inflating means connected to the first inflatable member for inflating said first inflatable member with a compressible fluid to thereby move said ramp from the horizontal position to the inclined position, a lip hinged to the forward edge of said ramp and movable between a downwardly hanging pendant position and an extended position where said lip forms an extension to said ramp, and a second inflatable member connected between the ramp and the lip, said inflating means being connected to said second inflatable member whereby inflation of said second inflatable member will pivot the lip from the pendant to the extended position.

13. In combination, a loading dock having an upper surface and a vertical front face and having a pit in said upper surface, a dock leveler mounted in the pit and including a ramp having a rear end hinged to the dock and movable between a horizontal position where said ramp is generally flush with said upper surface to an upwardly inclined position, a first inflatable bag disposed in the pit and having a surface in bearing contact with the undersurface of said ramp, inflating means for inflating said bag to thereby pivot said ramp from the horizontal position to the inclined position, a lip hinged to the forward end of the ramp and movable between a downwardly hanging pendant position and an extended position where the lip forms an extension to the ramp, a second inflatable bag interconnected between the ramp and the lip, said second bag being connected to said inflating means whereby inflation of said second bag will pivot the lip from the pendant to the extended position.

14. In combination, a loading dock, a dock leveler mounted on the dock and including a ramp having a rear end hinged to the dock and movable between a horizontal position to an upwardly inclined position, a lip hinged to the forward edge of said ramp and movable between a downwardly hanging pendant position and an extended position where the lip forms an extension to the ramp, a flexible inflatable bag disposed beneath the ramp and having a surface in bearing contact with the undersurface of said ramp, conduit means connected to said bag, a power operated fan disposed in said conduit means for supplying a compressible fluid to said bag to thereby inflate said bag and pivot said ramp from the horizontal position to the inclined position, and flow restriction means in said conduit means for impeding flow of said fluid from the bag through said conduit means on discontinuation of operation of said fan to effect controlled descent of the ramp from the inclined position toward the horizontal position.

15. The combination of claim 14, wherein said fan is mounted on the undersurface of said ramp.

16. The combination of claim 14, wherein said blower for supporting the ramp in said horizontal position when said bag is deflated.

17. The combination of claim 16, wherein said means for supporting the ramp comprises a fixed abutment to support the pendant lip.

18. The combination of claim 14, wherein said fan comprises said flow restriction means.

19. A method of loading cargo between a loading dock and the bed of a carrier parked in front of the dock, comprising the steps of mounting a dock leveler on a loading dock, said dock leveler including a ramp having a rear end hinged to the dock and movable between a horizontal position and an upwardly inclined position and said dock leveler having a lip hinged to a forward end of the ramp and movable between a downwardly hanging pendant position and an extended position where the lip forms an extension to the ramp, positioning an inflatable bag beneath the ramp and in bearing engagement with the underside of the ramp, connecting the outlet of an electrically operated inflating means to the bag, operating the inflating means to supply a compressible fluid to said bag at a pressure of 0.5 to 5.0 psig to inflate the bag and pivot the ramp from the horizontal position to the inclined position, moving the lip from the pendant position to the extended position, discontinuing the supply of said fluid to said bag and effecting downward pivotal movement of the ramp to deflate the bag, and exhausting fluid from the bag through a restriction as the bag is deflated to cause controlled descent of the ramp and bring the lip into contact with the bed of the carrier so that cargo can be transferred between said bed and said loading dock.

20. The method of claim 19, wherein the step of exhausting fluid from the bag through a restriction comprises back-flowing the fluid from the bag through said inflating means.

21. In combination, a loading dock having an upper surface and a vertical front face and having a pit in said upper surface, a dock leveler mounted in the pit and including a ramp having a rear end hinged to the dock and movable between a horizontal position where said ramp is generally flush with said upper surface to an upwardly inclined position, a lip hinged to the forward edge of said ramp and movable between a downwardly hanging pendant position and an extended position where the lip forms an extension to the ramp, a flexible inflatable bag disposed in the pit and having a surface in bearing contact with the undersurface of said ramp, conduit means connected to said bag, a power operated fan connected to said conduit means for supplying compressible fluid to said bag to thereby inflate the bag and pivot said ramp from the horizontal position to the inclined position, said fan being disposed within the confines of the pit when the ramp is in the horizontal position.

22. The combination of claim 21, wherein the fan is mounted on the underside of the ramp.

* * * * *

UNITED STATES PATENT AND TRADEMARK OFFICE
CERTIFICATE OF CORRECTION

PATENT NO. : 5,500,968
DATED : March 26, 1996
INVENTOR(S) : Charles H. Hodges

It is certified that error appears in the above—identified patent and that said Letters Patent is hereby corrected as shown below:

Column 8, line 12, in Claim 16 delete "wherein said blower" and insert --and including means--.

Signed and Sealed this

Twenty-seventh Day of August, 1996

Attest:

BRUCE LEHMAN

Attesting Officer

Commissioner of Patents and Trademarks

REEXAMINATION CERTIFICATE (4015th)

United States Patent [19]
Hodges

[11] B1 5,500,968
[45] Certificate Issued Mar. 14, 2000

[54] DOCK LEVELER INCORPORATING AN INFLATABLE BAG

[75] Inventor: Charles H. Hodges, Ruxton, Md.

[73] Assignee: Kelley Company, Inc.

Reexamination Request:
No. 90/005,092, Aug. 31, 1998

Reexamination Certificate for:
Patent No.: 5,500,968
Issued: Mar. 26, 1996
Appl. No.: 08/250,650
Filed: May 27, 1994

Certificate of Correction issued Aug. 27, 1996.

Related U.S. Application Data

[63] Continuation of application No. 07/814,002, Dec. 26, 1991, abandoned.

[51] Int. Cl.[7] ..................................................... E01D 1/00
[52] U.S. Cl. ......................... 14/71.7; 14/71.3; 254/93 L
[58] Field of Search ................................ 14/71.7, 71.3, 14/71.1, 70, 35; 254/93 L, 93 R, 93 HP

[56] References Cited

U.S. PATENT DOCUMENTS

| | | |
|---|---|---|
| 2,495,092 | 1/1950 | Cox et al. . |
| 2,804,118 | 8/1957 | Bayerkohler . |
| 3,117,332 | 1/1964 | Kelley et al. . |
| 3,211,425 | 10/1965 | Greulich et al. . |
| 3,521,861 | 7/1970 | Freudenthal et al. . |
| 3,528,118 | 9/1970 | Smith . |
| 3,659,899 | 5/1972 | Phillips et al. . |
| 3,711,157 | 1/1973 | Smock ..................................... 298/8 R |
| 4,012,804 | 3/1977 | Catlett ........................................ 14/71.3 |
| 4,081,874 | 4/1978 | Artzberger ................................ 14/71.7 |
| 4,293,969 | 10/1981 | Frommelt . |
| 4,343,058 | 8/1982 | Loblick ..................................... 14/71.7 |
| 4,572,579 | 2/1986 | Saito . |
| 4,688,760 | 8/1987 | Garman et al. ...................... 254/93 HP |
| 4,955,923 | 9/1990 | Hageman . |
| 5,042,103 | 8/1991 | Megens . |
| 5,446,938 | 9/1995 | Warner et al. ............................ 14/71.3 |
| 5,471,693 | 12/1995 | Hodges ..................................... 14/71.3 |
| 5,481,774 | 1/1996 | Hodges et al. ............................ 14/71.7 |

FOREIGN PATENT DOCUMENTS

| | | |
|---|---|---|
| 386850 | 9/1990 | European Pat. Off. . |
| 2354388 | 5/1974 | Germany .......................... 254/93 HP |
| 161243 | 7/1964 | U.S.S.R. ............................... 298/22 R |
| 835142 | 5/1960 | United Kingdom ............... 254/93 HP |

*Primary Examiner*—James A. Lisehora

[57] ABSTRACT

A dock leveler comprising a ramp hinged at its rear end to a supporting structure and movable between a generally horizontal position and an upwardly inclined position. A lip is hinged to the forward edge of the ramp and can be pivoted between a downwardly hanging pendant position and an extended position. Interposed between the ramp and the supporting structure is an inflatable bag, while a second inflatable bag interconnects the ramp and the lip. Blowers mounted beneath the ramp supplies low pressure air to both bags, and inflation of the first bag will move the ramp upwardly to the inclined position, while inflation of the second bag will move the lip from the pendant to the extended position.

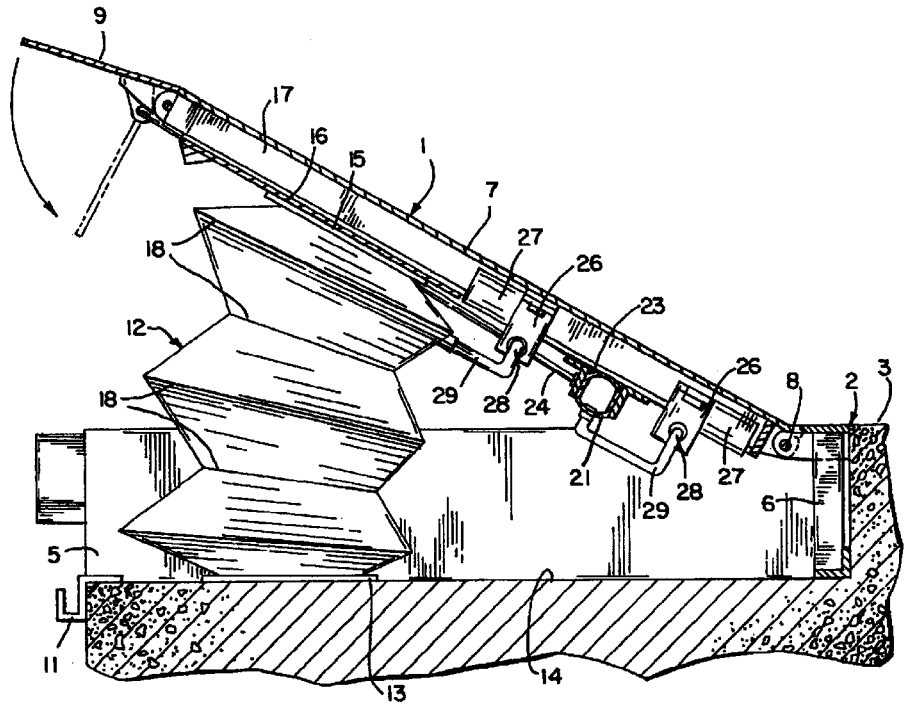

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–13 is confirmed.

Claims 15, 19–20 and 22 are cancelled.

Claims 14 and 21 are determined to be patentable as amended.

Claims 16–18, dependent on an amended claim, are determined to be patentable.

14. In combination, a loading dock, a dock leveler mounted on the dock and including a ramp having a rear end hinged to the dock and movable between a horizontal position to an upwardly inclined position, a lip hinged to the forward edge of said ramp and movable between a downwardly hanging pendant position and an extended position where the lip forms an extension to the ramp, a flexible inflatable bag disposed beneath the ramp and having a surface in bearing contact with the undersurface of said ramp, conduit means connected to said bag, a power operated fan disposed in said conduit means for supplying a compressible fluid to said bag to thereby inflate said bag and pivot said ramp from the horizontal position to the inclined position, and flow restriction means in said conduit means for impeding flow of said fluid from the bag through said conduit means on discontinuation of operation of said fan to effect controlled descent of the ramp from the inclined position toward the horizontal position, *wherein said fan is mounted on the under surface of said ramp.*

21. In combination, a loading dock having an upper surface and a vertical front face and having a pit in said upper surface, a dock leveler mounted in the pit and including a ramp having a rear end hinged to the dock and movable between a horizontal position where said ramp is generally flush with said upper surface to an upwardly inclined position, a lip hinged to the forward edge of said ramp and movable between a downwardly hanging pendant position and an extended position where the lip forms an extension to the ramp, a flexible inflatable bag disposed in the pit and having a surface in bearing contact with the undersurface of said ramp, conduit means connected to said bag, a power operated fan connected to said conduit means for supplying compressible fluid to said bag to thereby inflate the bag and pivot said ramp from the horizontal position to the inclined position, said fan being disposed within the confines of the pit when the ramp is in the horizontal position, *wherein the fan is mounted on the underside of said ramp.*

* * * * *